United States Patent [19]
Gilroy

[11] Patent Number: 4,652,020
[45] Date of Patent: Mar. 24, 1987

[54] PIPEWORK

[75] Inventor: John E. Gilroy, Ashton Under Lyne, England

[73] Assignee: National Nuclear Corporation Limited, London, England

[21] Appl. No.: 710,065

[22] Filed: Mar. 11, 1985

[30] Foreign Application Priority Data

Mar. 22, 1984 [GB] United Kingdom ............... 8407493

[51] Int. Cl.$^4$ ............................................. F16Z 59/14
[52] U.S. Cl. ........................................ 285/47; 285/55; 285/156; 285/173; 285/377; 376/292; 138/148; 138/149; 29/157 T
[58] Field of Search .................. 285/47, 55, 156, 173, 285/377, 398; 376/291, 292; 29/157 T; 138/113, 114, 148, 149; 165/134

[56] References Cited

U.S. PATENT DOCUMENTS

| | | | |
|---|---|---|---|
| 1,215,966 | 2/1917 | Murray | 285/55 |
| 2,475,635 | 7/1949 | Parsons | 285/156 |
| 3,064,707 | 11/1962 | Walts | 29/157 T |
| 3,120,247 | 2/1964 | Vogler | 138/148 |
| 3,293,137 | 12/1966 | Hutchinson et al. | 376/292 |
| 3,525,669 | 8/1970 | Germer | 376/291 |
| 4,191,246 | 3/1980 | Cassell | 165/134 |
| 4,315,644 | 2/1982 | Jansing . | |

FOREIGN PATENT DOCUMENTS 884910 12/1961 United Kingdom .

Primary Examiner—Cornelius J. Husar
Assistant Examiner—Douglas W. Hanson
Attorney, Agent, or Firm—William R. Hinds

[57] ABSTRACT

A pipework junction (10, 11) has internal insulation to limit the effect of thermal shock in the form of a two part (14, 15) internal sleeve in which the parts of the sleeve are joined (34) and are, for the most part of their external surfaces, spaced from the junction by a small clearance (20) adequate to ensure that they do not lock to the junction when subjected to thermal shock. Piston rings (62) may be provided to restrain flow along the small clearance and the sleeve may be stabilized in the junction by having an expanded part (63) engaging a recess (64), which also serves to restrain flow along the small clearance.

8 Claims, 6 Drawing Figures

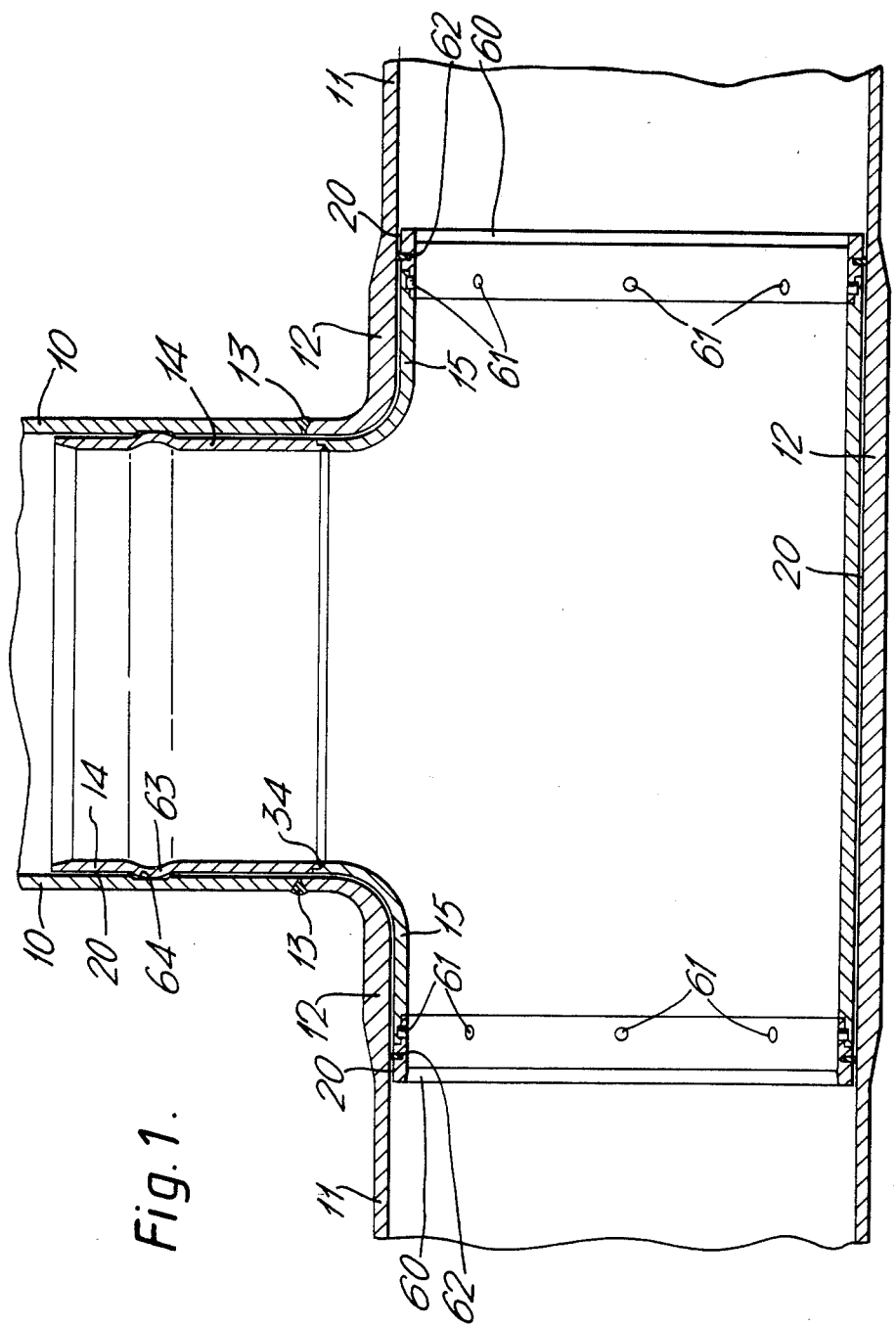

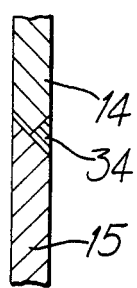
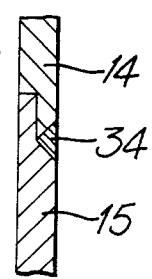
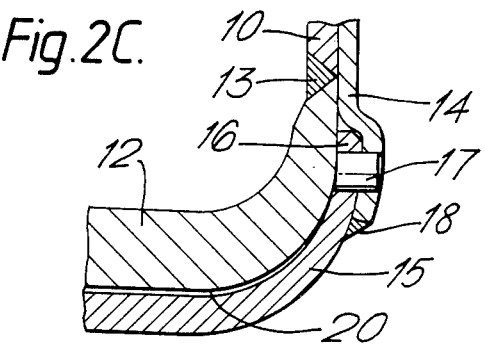
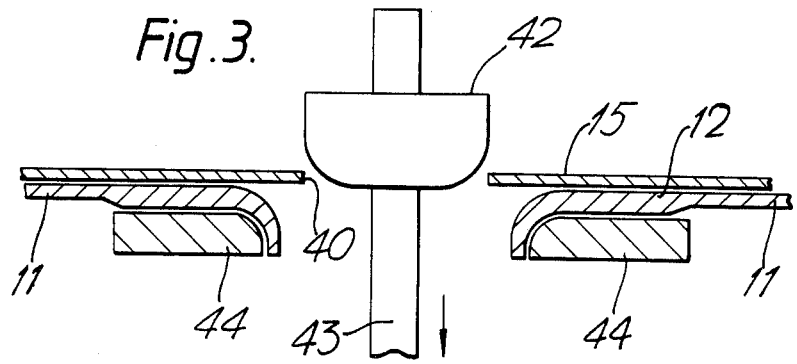

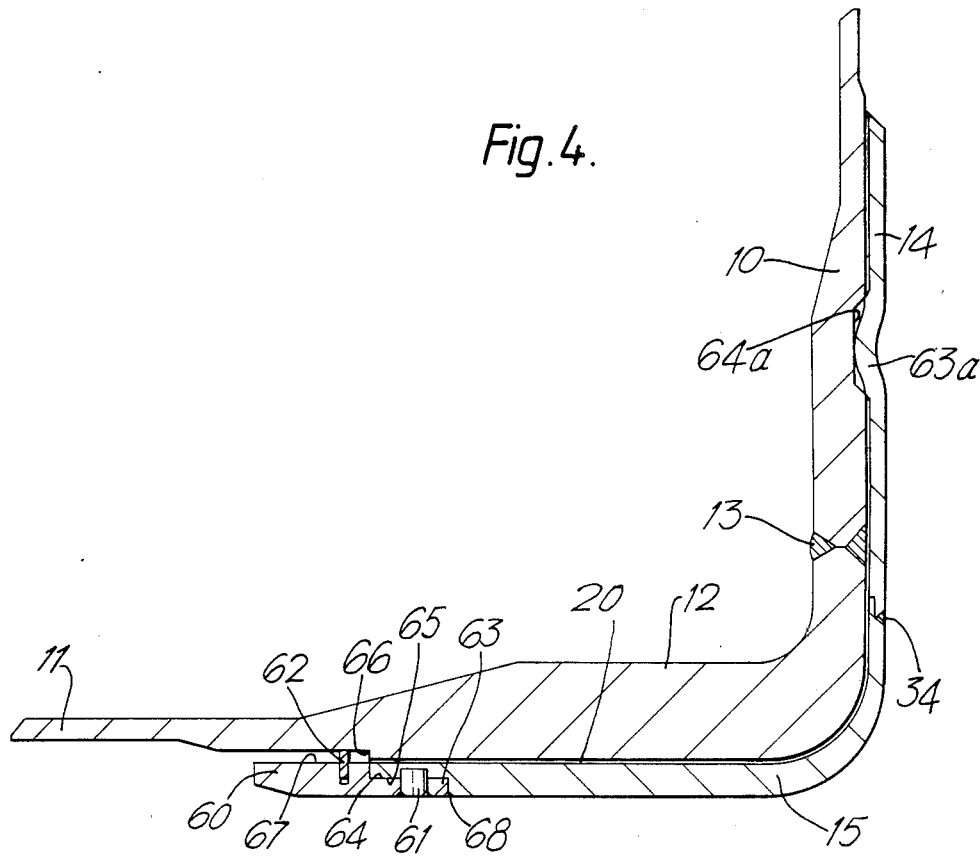

PIPEWORK

BACKGROUND OF THE INVENTION

This invention relates to pipework.

This invention is particularly concerned with junctions in pipework for heat transport systems using liquid sodium as seen, for example, in fast fission nuclear reactors.

One of the problems involved with sodium-conducting pipework is that of thermal shock. The heat transfer capacity of sodium is so high that a sudden change of sodium temperature (such as may arise from a reactor trip) would give rise to severe stresses. The problem is ameliorated to some extent by the fact that the sodium is usually not operating at any substantial pressure and hence pipework, for the most part, can be of thin wall and hence is more tolerant to sudden temperature changes. However, this amelioration is not so significant at junctions where it may be essential to thicken the pipe wall to accommodate mechanical working during manufacture and where other stresses might have to be met such as those arising from pipework thermal expansion loadings or restraints on the pipes at the junction.

FEATURES AND ASPECTS OF THE INVENTION

The object of the present invention is to provide a pipework junction with improved resistance to thermal shock.

According to one aspect of the present invention there is provided a metal pipework junction comprising angularly related main and branch sections provided internally with thermal insulation, characterised in that: the thermal insulation comprises a metal sleeve located in the main section and having a lateral extension which extends into the branch section, said sleeve and extension for most of their external surfaces being spaced from the internal surfaces of the junction by a small clearance; and means is provided for restricting flow along said clearance.

According to a second aspect of the invention there is provided a metal pipework junction comprising angularly related main and branch sections provided internally with thermal insulation, characterised in that: the thermal insulation comprises a metal sleeve located in the main section and having a lateral extension which extends into the branch section, said sleeve and extension for most part of their external surfaces being spaced from the internal surfaces of the junction by a small clearance; said sleeve and/or extension at or adjacent the end thereof has an internal surface portion which is axially offset from but substantially concentric with an internal surface portion of the junction adjacent said sleeve or extension end; an annular carrier is partially inserted into said sleeve or extension so that part of the carrier projects into overlying relation with said internal surface portion of the junction, said annular carrier being attached to the sleeve or extension with an external surface of the carrier in making relation with the internal surface portion of the sleeve or extension; and at least one radially expansible and contractible ring is mounted on the projecting carrier part and contacts said internal surface portion of the junction to restrict fluid flow in said clearance.

According to a further aspect of the present invention there is provided a method of thermally insulating a metal pipework junction comprising angularly related main and branch sections, said method including the steps of inserting a metal sleeve with clearance into said main section so as to bring an aperture in the sleeve wall into registry with the branch section; drawing a forming body from the interior of the sleeve through said aperture and along the branch section so as to deform the marginal portions around the aperture laterally and outwardly into said branch section; and attaching at least one flow restrictor to the sleeve to restrict flow of fluid in the clearance between the external and internal surfaces respectively of the sleeve and the junction.

DESCRIPTION OF THE DRAWINGS

The invention will now be described further, by way of example, with reference to the accompanying drawings in which:

FIG. 1 shows a sodium-conducting pipework T-junction in section;

FIGS. 2A, 2B and 2C illustrate various forms of joint between the liner sleeve parts;

FIG. 3 is a schematic view illustrating formation of the internal lining sleeve so as to conform with the T-configuration of the junction.

FIG. 4 is a detail view illustrating location of piston ring housings within the T-junction.

DESCRIPTION OF THE PREFERRED EMBODIMENTS

In FIG. 1, the basic sodium-conducting pipework comprises a vertical branch pipe 10 making a T-junction with a horizontal main pipe 11. The pipe 11 has a thickened region 12 to provide sufficient strength for service mechanical loads. Pipes 10 and 11 are joined at a weld 13 thus making a T-junction.

Inside the T-junction there is an internal sleeve formed as two parts, namely the vertical sleeve part 14 and the horizontal sleeve part 15. These two parts can be joined at 34 in the manner indicated in FIGS. 2A or 2B. Alternatively they may be jointed as shown in FIG. 2C, ie the two parts overlap at a band 16, are located with one another by dowels 17, and joined at a weld 18.

Over most of their external surfaces the parts 14, 15 are spaced from the pipework 10, 11. This is indicated by the reference numeral 20 which represents spaces that can range up to about 4 mm. (The branch pipe diameter is typically 640 mm and the main pipe diameter is 820 mm). To avoid looseness of the parts 14, 15 the three ends are dimensioned to minimise the spaces 20 in their locality. There will be inevitably some small contact areas between sleeve parts 14, 15 and pipe parts 10, 11.

To manufacture the construction described above the pipe 11 is first taken, a hole is cut and a former is drawn through the hole from inside the pipe to create an upstand collar which can be end prepared to accept the weld 13 and pipe 10. The sleeve part 15, with an appropriate oval-shaped hole 40 in the wall already made, is then inserted in the pipe 11 (see FIG. 3) and another former 42 is attached to draw bar 43 and drawn through the hole to create a lateral upstand collar which can be end prepared for attachment to the sleeve part 14. The formation of the upstand collar on the sleeve part 15 will in general involve drawing formers of increasingly greater diameter through the hole in the sleeve 15. During such formation, the upstand collar previously formed on the pipe 11 acts as a die and may be supported by a support ring 44.

In use, the spaces 20 between sleeve parts and pipe parts tend to fill with sodium and while the insulation effect generated by the sleeve parts 14, 15 and sodium affords some reduction in thermal stressing of pipes 10, 11 and weld 13, some degree of sodium flow inevitably takes place in spaces 20 and can lead to unacceptable thermal stressing of the junction. To overcome this, the junction is provided with flow restriction means which may be associated with the sleeve part 15 and/or the sleeve part 14.

FIG. 1 illustrates one form of flow restrictor arrangement in which the extremities of the sleeve part 15 are each provided with a piston ring housing 60 attached by dowels 61 to the sleeve part 15, each piston ring housing mounting a piston ring 62. The arrangement is shown in greater detail in FIG. 4. The piston ring housings 60 are installed after the sleeve part 14 and 15 have been assembled to the junction. The housing 60 is in the form of an annular member comprising a carrier 63 having a truly cylindrical external surface 64.

The installation procedure involves accurately machining truly cylindrical and concentric surface portions 65, 66 on the sleeve part 15 and the pipe 11 so that when the housing 60 is inserted as shown, with surface 64 mating with surface 65, the surface 67 in which the piston ring is mounted is concentric with the surface 66 whereby the piston ring 62 axially slidably contacts the latter surface. The dowel 61 can then be inserted and welded in place and for additional security a weld may also be made at 68 between the housing 60 and the sleeve part 15.

The internal sleeve provided by parts 14, 15 is stabilised in the T-junction by an expanded region 63a (which may be continuous or may comprise a number of circumferentially-spaced portions) on the sleeve part 14 engaging a recess 64a in the branch pipe 10. This may also serve to further restrict flow along the space 20.

The pipe junction described and illustrated is designed in such a way that tolerances between the pipes 10, 11 and the sleeve parts 14, 15 are not critical since flow of sodium along the clearance spaces 20 is restricted and, in effect, the sodium collecting in these spaces is stagnant and does not therefore undermine the thermal insulation provided by the sleeve parts 14, 15. It will be understood that, because the piston rings 62 are split circumferentially they act as flow restrictors but do not completely prevent penetration of sodium into the clearances 20, which is desirable as long as the flow of sodium is suppressed in these regions. In addition, the piston rings 62 effect flow restriction without giving rise to the possibility of the pipes 10, 11 becoming locked with the sleeve parts 14, 15 under normal service conditions and when subjected to thermal shock.

We claim:

1. A metal pipework junction comprising angularly related main and branch sections provided internally with thermal insulation, characterised in that: the thermal insulation comprises a metal sleeve located in the main section and having a lateral extension which is integral with the metal sleeve and extends into the branch section, said sleeve and extension for most of their external surfaces being spaced from the internal surface of the pipework junction by a small clearance, the external surfaces defining the clearance being imperforate; and means is provided for restricting flow along said clearance.

2. A junction as claimed in claim 1 in which said flow restricting means is located between generally concentric annular surfaces associated with the sleeve or extension and the junction and is arranged to contact one of said annular surfaces.

3. A junction as claimed in claim 1 in which said flow restricting means is arranged to allow entry of fluid into said clearance whereby a quantity of substantially stagnant fluid can collect in said clearance.

4. A junction as claimed in claim 1 in which said flow restricting means comprises a radially expansible and contractible ring contacting a portion of the internal surface of the junction and located by the external surface of said sleeve or extension which is substantially concentric with said internal surface portion of the junction.

5. A junction as claimed in claim 4 in which said ring is carried by a housing which is attached at or adjacent one end of said sleeve and/or extension and has a surface which mates with said substantially concentric surface of the sleeve or extension so as to locate the ring in substantially concentric relation with said internal surface portion of the junction.

6. A metal pipework junction comprising angularly related main and branch sections provided internally with thermal insulation, characterised in that: the thermal insulation comprises a metal sleeve located in the main section and having a lateral extension which extends into the branch section, said sleeve and extension for most part of their external surfaces being spaced from the internal surface of the pipework junction by a small clearance; said sleeve and/or extension at or adjacent the end thereof has an internal surface portion which is offset from but substantially concentric with an internal surface portion of the pipework junction adjacent said sleeve or extension end; an annular carrier is partially inserted into said sleeve or extension so that part of the carrier projects into overlying relation with said internal surface portion of the pipework junction, said annular carrier being attached to the sleeve or extension with an external surface of the carrier in mating relation with the internal surface portion of the sleeve or extension; and at least one radially expansible and contractible ring is mounted on the projecting carrier part and contacts said internal surface portion of the pipework junction to restrict fluid flow in said clearance.

7. A junction as claimed in claim 1 in which said extension comprises a section of the sleeve which has been deformed laterally of the sleeve so as to enter the branch section.

8. A junction as claimed in claim 7 in which said extension further comprises a tubular section attached to the laterally deformed section of the sleeve.

* * * * *